F. DAY.
POTATO DIGGING ATTACHMENT FOR PLOWS.
APPLICATION FILED JUNE 14, 1909.

958,603.

Patented May 17, 1910.

Witnesses
Lloyd W. Patch
A. A. Hammond

Inventor
Frederick Day
By C. N. Brandenburg
his Attorney

UNITED STATES PATENT OFFICE.

FREDERICK DAY, OF WEST ZORRA TOWNSHIP, OXFORD COUNTY, ONTARIO, CANADA.

POTATO-DIGGING ATTACHMENT FOR PLOWS.

958,603.  Specification of Letters Patent.  Patented May 17, 1910.

Application filed June 14, 1909. Serial No. 502,118.

*To all whom it may concern:*

Be it known that I, FREDERICK DAY, a British subject, residing in the township of West Zorra and county of Oxford and Province of Ontario and Dominion of Canada, have invented new and useful Improvements in Potato-Digging Attachments for Plows, of which the following is a specification.

My invention relates to an improvement in potato digging attachments for plows, and the object is to provide means for receiving the earth and potatoes dug by the plow for sifting or separating the potatoes from the earth and allowing the potatoes to lie upon the surface where they can be readily gathered.

The invention consists of certain novel features of construction and combination of parts hereinafter described and pointed out in the claims.

Figure 1:
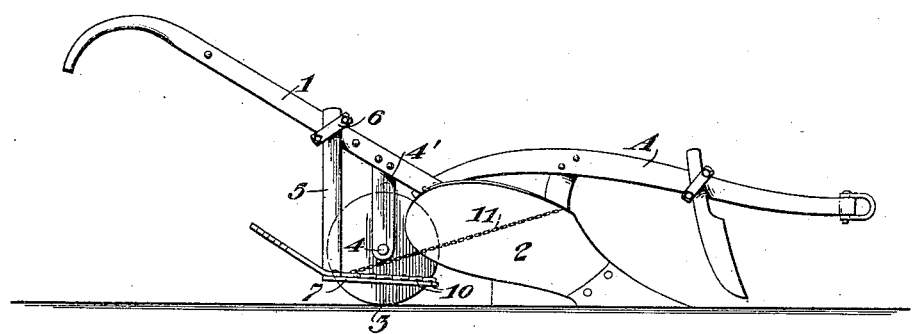
Figure 2:
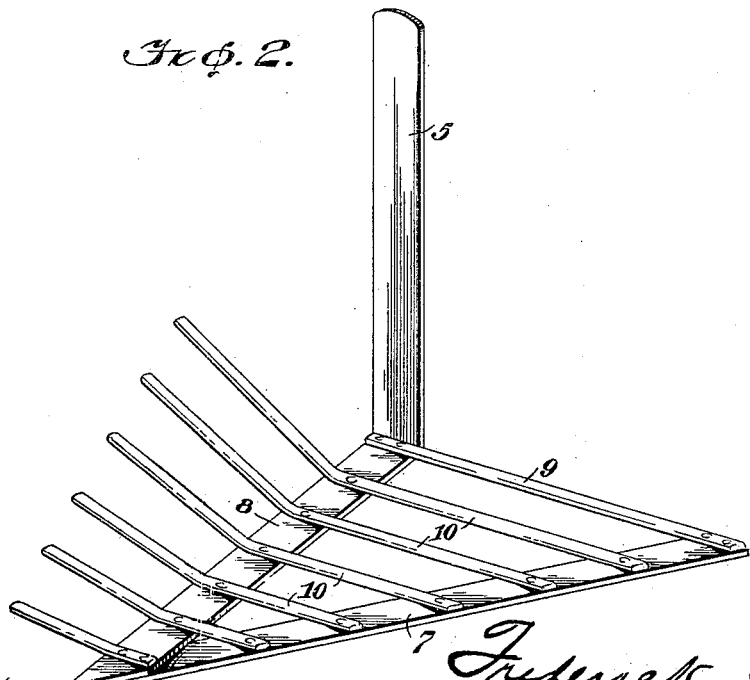

In the accompanying drawings, Figure 1 is a side elevation showing the invention applied to a plow, and Fig. 2 is a perspective view of the sifting or separating attachment.

A represents a plow-beam and 1 a handle. The usual mold-board 2 is connected to the plow-beam A. A disk or wheel 3 is mounted upon a shaft 4, which shaft is supported from the arm 1 by a bar 4'. A right-angular bar 5 is connected to the arm of the plow by means of a clamp 6. The clamp allows the adjustment of the bar 5 to suit the requirements, whereby the bar can be adjusted to any desired elevation. Plate 7 is connected to the horizontal portion 8 of the bar 5 forming a triangle, the innermost end of the plate 7 being connected with the horizontal bar 8 by a rod 9 rigidly connecting two bars together. Rods 10—10 are connected to the plate 7 and horizontal portion 8, forming a base or bottom, and the outer or rear portion of the rods projecting upwardly from the horizontal bar for forming a means for breaking up the earth and loosening the potatoes therefrom. A chain 11 is connected to the bar 5 and to the plow for insuring the proper rigidity for the separating attachment.

In the operation the plow will be drawn along the hills or rows of potatoes causing the earth to be raised and thrown upon the rods 10 which are connected to the plate 7 and horizontal bar 8. The earth and potatoes will be caused to come in contact with the upwardly projecting ends of the rods 10 where the earth is broken and potatoes separated therefrom and allowed to discharge upon the surface of the soil. The disk or wheel 3 will enter the soil and prevent the attachment and plow from moving laterally, and aid the plow and attachment in resisting the pressure of the soil thereon.

Having thus described my invention, what I desire to secure by Letters Patent is:—

1. In a potato digging attachment, the combination with a plow having a mold-board, of an angular bar connected to the plow, a plate connected to the bar and extending inwardly therefrom, and rods connecting the plate and bar together, upon which the earth and potatoes are received from the mold-board, said rods projecting upwardly for separating the earth and potatoes.

2. In a potato digging attachment, the combination with a plow having a mold-board, of an angular bar adjustably connected to the plow, a plate connected to the bar and extending at an angle therefrom, rods connecting the plate and bar together forming the bottom on which the earth and potatoes are received, said rods projecting upwardly from the bar for separating the earth and potatoes, and a wheel connected to the plow adapted to enter the earth to prevent lateral movement of the plow and attachment.

FREDERICK DAY.

Witnesses:
EDNA TRIPP,
JOSEPH GARFIELD GIBSON.